(12) United States Patent  
Wu

(10) Patent No.: US 9,689,604 B2  
(45) Date of Patent: Jun. 27, 2017

(54) MULTI-SECTION CORE VACUUM INSULATION PANELS WITH HYBRID BARRIER FILM ENVELOPE

(71) Applicant: Whirlpool Corporation, Benton Harbor, MI (US)

(72) Inventor: Guolian Wu, St. Joseph, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 129 days.

(21) Appl. No.: 14/187,605

(22) Filed: Feb. 24, 2014

(65) Prior Publication Data

US 2015/0241118 A1   Aug. 27, 2015

(51) Int. Cl.
| | |
|---|---|
| B32B 1/06 | (2006.01) |
| B32B 17/06 | (2006.01) |
| F25D 23/06 | (2006.01) |
| B32B 37/00 | (2006.01) |
| B32B 37/10 | (2006.01) |

(52) U.S. Cl.
CPC ........ F25D 23/065 (2013.01); B32B 37/0076 (2013.01); B32B 37/10 (2013.01); F25D 23/06 (2013.01); B32B 2305/22 (2013.01); B32B 2305/30 (2013.01); B32B 2307/304 (2013.01); B32B 2307/728 (2013.01); B32B 2309/68 (2013.01); B32B 2509/10 (2013.01); F25D 2201/14 (2013.01); Y10T 428/31678 (2015.04)

(58) Field of Classification Search
USPC .................. 428/426, 428, 68, 69, 74, 76
See application file for complete search history.

(56) References Cited

U.S. PATENT DOCUMENTS

| | | | |
|---|---|---|---|
| 948,541 | A | 2/1910 | Coleman |
| 1,275,511 | A | 8/1918 | Welch |
| 2,108,212 | A | 2/1938 | Schellens |
| 2,128,336 | A | 8/1938 | Folke |

(Continued)

FOREIGN PATENT DOCUMENTS

| | | |
|---|---|---|
| CA | 1320631 C | 7/1993 |
| CA | 2259665 A1 | 1/1998 |

(Continued)

OTHER PUBLICATIONS

JP2006161945 English machine translation.*

(Continued)

*Primary Examiner* — Lauren R Colgan  
(74) *Attorney, Agent, or Firm* — Price Heneveld LLP

(57) ABSTRACT

A multi-layer vacuum insulating panel that includes: a first barrier film having at least one polymeric material layer and; a second barrier film having at least one interior polymeric layer, a metal foil layer, and at least one exterior polymeric layer positioned on the opposite side of the metal foil layer as the at least one interior polymeric layer; a sealing junction between the first barrier film and the second barrier film at a sealing section about a perimeter of the first barrier film and the second barrier film where the first barrier film and the second barrier film physically and sealingly engage one another; and a multi-section central core having a first fumed silica region that contains at least one fumed silica compound and at least one fibrous (fiberglass) region that are each discrete regions within the interior volume.

20 Claims, 9 Drawing Sheets

(56) References Cited

U.S. PATENT DOCUMENTS

| | | | |
|---|---|---|---|
| 2,164,143 A | 6/1939 | Georg | |
| 2,318,744 A | 5/1943 | Brown et al. | |
| 2,356,827 A | 8/1944 | Coss et al. | |
| 2,439,602 A | 4/1948 | Heritage | |
| 2,439,603 A | 4/1948 | Heritage | |
| 2,538,780 A | 1/1951 | Hazard | |
| 2,559,356 A | 7/1951 | Hedges | |
| 2,768,046 A | 10/1956 | Evans | |
| 2,817,123 A | 12/1957 | Jacobs | |
| 2,942,438 A | 6/1960 | Schmeling | |
| 2,985,075 A | 5/1961 | Knut | |
| 3,086,830 A | 4/1963 | Malia | |
| 3,125,388 A | 3/1964 | Costantini | |
| 3,137,900 A | 6/1964 | Carbary | |
| 3,218,111 A | 11/1965 | Steiner | |
| 3,258,883 A | 7/1966 | Goldstone | |
| 3,358,059 A | 12/1967 | Synder | |
| 3,379,481 A | 4/1968 | Fisher | |
| 3,471,416 A | 10/1969 | Fijal | |
| 3,635,536 A | 1/1972 | Lackey et al. | |
| 3,688,384 A | 9/1972 | Mizushima et al. | |
| 4,006,947 A | 2/1977 | Haag | |
| 4,043,624 A | 8/1977 | Lindenschmidt | |
| 4,050,145 A | 9/1977 | Benford | |
| 4,067,628 A | 1/1978 | Sherburn | |
| 4,325,734 A | 4/1982 | Burrage et al. | |
| 4,332,429 A | 6/1982 | Frick | |
| 4,417,382 A | 11/1983 | Schilf | |
| 4,492,368 A | 1/1985 | DeLeeuw et al. | |
| 4,548,196 A | 10/1985 | Torobin | |
| 4,660,271 A | 4/1987 | Lenhardt | |
| 4,669,632 A * | 6/1987 | Kawasaki | F16L 59/08 220/592.27 |
| 4,671,909 A | 6/1987 | Torobin | |
| 4,671,985 A | 6/1987 | Rodrigues et al. | |
| 4,726,974 A * | 2/1988 | Nowobilski | B32B 15/08 428/219 |
| 4,745,015 A | 5/1988 | Cheng et al. | |
| 4,777,154 A | 10/1988 | Torobin | |
| 4,805,293 A | 2/1989 | Buchser et al. | |
| 4,917,841 A | 4/1990 | Jenkins | |
| 5,007,226 A | 4/1991 | Nelson | |
| 5,018,328 A * | 5/1991 | Cur | F16L 59/065 428/74 |
| 5,033,636 A | 7/1991 | Jenkins | |
| 5,066,437 A | 11/1991 | Barito et al. | |
| 5,082,335 A | 1/1992 | Cur et al. | |
| 5,091,233 A * | 2/1992 | Kirby | B32B 1/06 206/484 |
| 5,118,174 A | 6/1992 | Benford et al. | |
| 5,157,893 A | 10/1992 | Benson et al. | |
| 5,175,975 A | 1/1993 | Benson et al. | |
| 5,212,143 A | 5/1993 | Torobin | |
| 5,221,136 A | 6/1993 | Hauck et al. | |
| 5,231,811 A | 8/1993 | Andrepont et al. | |
| 5,248,196 A | 9/1993 | Lynn et al. | |
| 5,252,408 A * | 10/1993 | Bridges | E04B 1/803 29/897.32 |
| 5,263,773 A | 11/1993 | Gable et al. | |
| 5,273,801 A | 12/1993 | Barry et al. | |
| 5,318,108 A | 6/1994 | Benson et al. | |
| 5,340,208 A | 8/1994 | Hauck et al. | |
| 5,353,868 A | 10/1994 | Abbott | |
| 5,359,795 A | 11/1994 | Mawby et al. | |
| 5,387,759 A | 2/1995 | Usa | |
| 5,418,055 A | 5/1995 | Chen et al. | |
| 5,433,056 A | 7/1995 | Benson et al. | |
| 5,477,676 A | 12/1995 | Benson et al. | |
| 5,505,810 A * | 4/1996 | Kirby | B32B 27/00 156/286 |
| 5,507,999 A | 4/1996 | Copsey et al. | |
| 5,509,248 A | 4/1996 | Dellby et al. | |
| 5,512,345 A | 4/1996 | Tsutsumi et al. | |
| 5,562,154 A | 10/1996 | Benson et al. | |
| 5,586,680 A | 12/1996 | Dellby et al. | |
| 5,632,543 A | 5/1997 | McGrath et al. | |
| 5,640,828 A | 6/1997 | Reeves et al. | |
| 5,643,485 A | 7/1997 | Potter et al. | |
| 5,652,039 A | 7/1997 | Tremain et al. | |
| 5,716,581 A | 2/1998 | Tirrell et al. | |
| 5,813,454 A | 9/1998 | Potter | |
| 5,827,385 A | 10/1998 | Meyer et al. | |
| 5,843,353 A | 12/1998 | De Vos et al. | |
| 5,866,228 A * | 2/1999 | Awata | B32B 1/06 428/69 |
| 5,868,890 A | 2/1999 | Fredrick | |
| 5,900,299 A | 5/1999 | Wynne | |
| 5,924,295 A | 7/1999 | Park | |
| 5,966,963 A | 10/1999 | Kovalaske | |
| 5,985,189 A | 11/1999 | Lynn et al. | |
| 6,094,922 A | 8/2000 | Ziegler | |
| 6,109,712 A | 8/2000 | Hayworth et al. | |
| 6,128,914 A | 10/2000 | Tamaoki | |
| 6,132,837 A | 10/2000 | Boes et al. | |
| 6,158,233 A | 12/2000 | Cohen et al. | |
| 6,164,030 A | 12/2000 | Dietrich | |
| 6,220,473 B1 | 4/2001 | Lehman et al. | |
| 6,221,456 B1 | 4/2001 | Pogorski | |
| 6,224,179 B1 | 5/2001 | Wenning et al. | |
| 6,260,377 B1 | 7/2001 | Tamaoki | |
| 6,305,768 B1 | 10/2001 | Nishimoto | |
| 6,390,378 B1 | 5/2002 | Briscoe et al. | |
| 6,406,449 B1 | 6/2002 | Moore et al. | |
| 6,408,841 B1 | 6/2002 | Hirath et al. | |
| 6,415,623 B1 | 7/2002 | Jennings et al. | |
| 6,460,955 B1 | 10/2002 | Vaughan | |
| 6,623,413 B1 | 9/2003 | Wynne | |
| 6,716,501 B2 | 4/2004 | Kovalchuk et al. | |
| 6,749,780 B2 | 6/2004 | Tobias | |
| 6,773,082 B2 | 8/2004 | Lee | |
| 6,858,280 B2 | 2/2005 | Allen et al. | |
| 6,931,204 B2 * | 8/2005 | Urata | B32B 1/04 392/441 |
| 6,938,968 B2 | 9/2005 | Tanimoto | |
| 7,026,054 B2 | 4/2006 | Ikegawa et al. | |
| 7,210,308 B2 | 5/2007 | Tanimoto et al. | |
| 7,284,390 B2 | 10/2007 | Meter et al. | |
| 7,296,432 B2 | 11/2007 | Muller et al. | |
| 7,316,125 B2 | 1/2008 | Uekado et al. | |
| 7,343,757 B2 | 3/2008 | Egan et al. | |
| 7,449,227 B2 | 11/2008 | Echigoya et al. | |
| 7,571,582 B2 * | 8/2009 | Hirai | F16L 59/065 428/69 |
| 7,625,622 B2 | 12/2009 | Teckoe et al. | |
| 7,641,298 B2 | 1/2010 | Hirath et al. | |
| 7,762,634 B2 | 7/2010 | Tenra et al. | |
| 7,815,269 B2 | 10/2010 | Wenning et al. | |
| 7,842,269 B2 | 11/2010 | Schachtely et al. | |
| 7,861,538 B2 | 1/2011 | Welle et al. | |
| 7,886,559 B2 | 2/2011 | Hell et al. | |
| 7,893,123 B2 | 2/2011 | Luisi | |
| 7,908,873 B1 | 3/2011 | Cur et al. | |
| 7,930,892 B1 | 4/2011 | Vonderhaar | |
| 8,113,604 B2 | 2/2012 | Olson et al. | |
| 8,117,865 B2 | 2/2012 | Allard et al. | |
| 8,163,080 B2 | 4/2012 | Meyer et al. | |
| 8,176,746 B2 | 5/2012 | Allard et al. | |
| 8,202,599 B2 | 6/2012 | Henn | |
| 8,211,523 B2 | 7/2012 | Fujimori et al. | |
| 8,281,558 B2 | 10/2012 | Hiemeyer et al. | |
| 8,299,545 B2 | 10/2012 | Chen et al. | |
| 8,343,395 B2 | 1/2013 | Hu et al. | |
| 8,353,177 B2 | 1/2013 | Adamski et al. | |
| 8,456,040 B2 | 6/2013 | Allard et al. | |
| 8,528,284 B2 | 9/2013 | Aspenson et al. | |
| 8,739,567 B2 | 6/2014 | Junge | |
| 8,739,568 B2 | 6/2014 | Allard et al. | |
| 8,752,918 B2 | 6/2014 | Kang | |
| 8,770,682 B2 | 7/2014 | Lee et al. | |
| 8,852,708 B2 | 10/2014 | Kim et al. | |
| 9,103,114 B2 * | 8/2015 | Kojima | E04B 1/803 |
| 2002/0168496 A1 | 11/2002 | Morimoto | |
| 2003/0008100 A1 | 1/2003 | Horn | |

(56) References Cited

U.S. PATENT DOCUMENTS

| | | | |
|---|---|---|---|
| 2003/0157284 A1* | 8/2003 | Tanimoto | B65D 81/18 428/36.1 |
| 2004/0178707 A1 | 9/2004 | Avendano | |
| 2004/0180176 A1 | 9/2004 | Rusek, Jr. | |
| 2004/0253406 A1 | 12/2004 | Hayashi et al. | |
| 2005/0235682 A1 | 10/2005 | Hirai | |
| 2006/0076863 A1 | 4/2006 | Echigoya | |
| 2006/0201189 A1 | 9/2006 | Adamski | |
| 2006/0263571 A1* | 11/2006 | Tsunetsugu | E04B 1/803 428/69 |
| 2007/0001563 A1 | 1/2007 | Park | |
| 2007/0099502 A1 | 5/2007 | Ferinauer | |
| 2007/0176526 A1 | 8/2007 | Gomoll et al. | |
| 2008/0300356 A1 | 12/2008 | Meyer et al. | |
| 2008/0309210 A1 | 12/2008 | Luisi | |
| 2009/0056367 A1 | 3/2009 | Neumann | |
| 2009/0058244 A1 | 3/2009 | Cho | |
| 2009/0113925 A1 | 5/2009 | Korkmaz | |
| 2009/0126974 A1* | 5/2009 | Yuasa | B29C 70/506 174/250 |
| 2009/0179541 A1* | 7/2009 | Smith | B29C 63/02 312/406 |
| 2009/0324871 A1 | 12/2009 | Henn | |
| 2010/0170279 A1 | 7/2010 | Aoki | |
| 2010/0231109 A1 | 9/2010 | Matzke et al. | |
| 2010/0293984 A1 | 11/2010 | Adamski | |
| 2010/0295435 A1 | 11/2010 | Kendall | |
| 2011/0030894 A1 | 2/2011 | Tenra | |
| 2011/0146325 A1 | 6/2011 | Lee | |
| 2011/0146335 A1 | 6/2011 | Jung | |
| 2011/0165367 A1 | 7/2011 | Kojima | |
| 2011/0241513 A1 | 10/2011 | Nomura et al. | |
| 2011/0241514 A1* | 10/2011 | Nomura | F16L 59/065 312/405 |
| 2011/0290808 A1 | 12/2011 | Bai et al. | |
| 2011/0315693 A1 | 12/2011 | Cur | |
| 2012/0000234 A1 | 1/2012 | Adamski | |
| 2012/0009376 A1* | 1/2012 | Rusek, Jr. | B32B 15/18 428/69 |
| 2012/0103006 A1 | 5/2012 | Jung | |
| 2012/0104923 A1 | 5/2012 | Jung | |
| 2012/0118002 A1 | 5/2012 | Kim | |
| 2012/0137501 A1 | 6/2012 | Allard | |
| 2012/0152151 A1 | 6/2012 | Meyer et al. | |
| 2012/0196059 A1 | 8/2012 | Fujimori et al. | |
| 2012/0231204 A1 | 9/2012 | Jeon et al. | |
| 2012/0237715 A1 | 9/2012 | McCracken | |
| 2012/0273111 A1 | 11/2012 | Nomura et al. | |
| 2012/0279247 A1 | 11/2012 | Katu | |
| 2012/0285971 A1 | 11/2012 | Junge et al. | |
| 2012/0297813 A1 | 11/2012 | Hanley et al. | |
| 2013/0033163 A1 | 2/2013 | Kang | |
| 2013/0068990 A1 | 3/2013 | Eilbracht et al. | |
| 2013/0101779 A1* | 4/2013 | Soh | F16L 59/065 428/69 |
| 2013/0111941 A1 | 5/2013 | Yu et al. | |
| 2013/0142983 A1* | 6/2013 | Han | B32B 5/26 428/69 |
| 2013/0255304 A1 | 10/2013 | Cur | |
| 2013/0256318 A1 | 10/2013 | Kuehl | |
| 2013/0257256 A1 | 10/2013 | Allard | |
| 2013/0257257 A1 | 10/2013 | Cur | |
| 2013/0264439 A1 | 10/2013 | Allard et al. | |
| 2013/0270732 A1 | 10/2013 | Wu | |
| 2013/0305535 A1 | 11/2013 | Cur | |
| 2014/0132144 A1 | 5/2014 | Kim et al. | |
| 2014/0144161 A1* | 5/2014 | Pointer | B65D 81/3823 62/62 |
| 2014/0171578 A1 | 6/2014 | Meyer et al. | |
| 2014/0178626 A1* | 6/2014 | Min | F16L 59/065 428/69 |
| 2014/0260332 A1 | 9/2014 | Wu | |
| 2014/0364527 A1 | 12/2014 | Wintermantel et al. | |
| 2015/0027628 A1 | 1/2015 | Cravens et al. | |
| 2015/0147514 A1 | 5/2015 | Shinohara et al. | |
| 2015/0168050 A1 | 6/2015 | Cur et al. | |
| 2016/0016380 A1* | 1/2016 | Jeon | B32B 15/14 428/69 |

FOREIGN PATENT DOCUMENTS

| | | |
|---|---|---|
| CA | 2640006 A1 | 8/2007 |
| CN | 1158509 C | 7/2004 |
| CN | 1970185 A | 5/2007 |
| CN | 100359272 C | 1/2008 |
| CN | 101437756 A | 5/2009 |
| CN | 201680116 U | 12/2010 |
| CN | 102296714 A | 12/2011 |
| CN | 102720277 A | 10/2012 |
| CN | 103072321 A | 5/2013 |
| CN | 203331442 U | 12/2013 |
| CN | 102452522 B | 12/2014 |
| DE | 1150190 | 6/1963 |
| DE | 19818890 A1 | 11/1999 |
| DE | 19915311 A1 | 10/2000 |
| DE | 102008026528 A | 5/2009 |
| DE | 102009046810 A | 5/2009 |
| DE | 102010024951 A1 | 12/2011 |
| DE | 102012223536 A1 | 6/2014 |
| DE | 102012223541 A1 | 6/2014 |
| EP | 0260699 A2 | 3/1988 |
| EP | 0480451 | 4/1992 |
| EP | 0691518 | 1/1996 |
| EP | 0860669 | 8/1998 |
| EP | 1087186 A3 | 9/2001 |
| EP | 1496322 A1 | 1/2005 |
| EP | 1505359 A1 | 2/2005 |
| EP | 1200785 B1 | 1/2006 |
| EP | 1243880 B1 | 7/2006 |
| EP | 1484563 B1 | 1/2008 |
| EP | 2342511 B1 | 8/2012 |
| EP | 2607073 A2 | 6/2013 |
| EP | 2789951 A1 | 10/2014 |
| FR | 2980963 B1 | 10/2014 |
| GB | 837929 A | 6/1960 |
| GB | 1214548 A | 12/1970 |
| JP | 73028353 B | 8/1973 |
| JP | 51057777 A | 5/1976 |
| JP | 59191588 U | 12/1984 |
| JP | 03013779 B2 | 2/1991 |
| JP | 06159922 A | 6/1994 |
| JP | 7001479 A | 1/1995 |
| JP | 0716167377 | 7/1995 |
| JP | 08300052 A | 11/1996 |
| JP | 08303686 A | 11/1996 |
| JP | 09166271 | 6/1997 |
| JP | 10113983 A | 5/1998 |
| JP | 11311395 A | 11/1999 |
| JP | 11336990 A | 12/1999 |
| JP | 2000097390 A | 4/2000 |
| JP | 2000117334 A | 4/2000 |
| JP | 2001038188 A | 2/2001 |
| JP | 2001116437 A | 4/2001 |
| JP | 2001336691 A | 12/2001 |
| JP | 2001343176 A | 12/2001 |
| JP | 03478771 B2 | 12/2003 |
| JP | 2004303695 A | 10/2004 |
| JP | 2005114015 A | 4/2005 |
| JP | 2005164193 A | 6/2005 |
| JP | 2005256849 A | 9/2005 |
| JP | 2006077792 A | 3/2006 |
| JP | 2006161945 A | 6/2006 |
| JP | 03792801 B2 | 7/2006 |
| JP | 2007263186 A | 10/2007 |
| JP | 4111096 B2 | 7/2008 |
| JP | 2008157431 A | 7/2008 |
| JP | 2009063064 A | 3/2009 |
| JP | 2009162402 A | 7/2009 |
| JP | 2009524570 | 7/2009 |
| JP | 2010017437 A | 1/2010 |
| JP | 2010071565 A | 4/2010 |
| JP | 2010108199 A | 5/2010 |
| JP | 2010145002 A | 7/2010 |

(56) References Cited

FOREIGN PATENT DOCUMENTS

| | | |
|---|---|---|
| JP | 04545126 B2 | 9/2010 |
| JP | 2010236770 A | 10/2010 |
| JP | 2010276309 A | 12/2010 |
| JP | 2011002033 A | 1/2011 |
| JP | 2011069612 A | 4/2011 |
| JP | 04779684 B2 | 9/2011 |
| JP | 2011196644 A | 10/2011 |
| JP | 2012026493 A | 2/2012 |
| JP | 04897473 B2 | 3/2012 |
| JP | 2012063029 A | 3/2012 |
| JP | 2012087993 A | 5/2012 |
| JP | 2012163258 A | 8/2012 |
| JP | 2012189114 A | 10/2012 |
| JP | 2012242075 A | 12/2012 |
| JP | 2013002484 A | 1/2013 |
| JP | 2013050242 A | 3/2013 |
| JP | 2013088036 A | 5/2013 |
| JP | 2013195009 A | 9/2013 |
| KR | 20020057547 A | 7/2002 |
| KR | 20020080938 A | 10/2002 |
| KR | 20030083812 A | 11/2003 |
| KR | 20040000126 A | 1/2004 |
| KR | 1020070044024 A | 4/2007 |
| KR | 1020080103845 A | 11/2008 |
| KR | 1017776 B1 | 2/2011 |
| KR | 20120007241 A | 1/2012 |
| KR | 2012046621 A | 5/2012 |
| KR | 2012051305 A | 5/2012 |
| WO | 9849506 A1 | 11/1998 |
| WO | 03089729 | 10/2003 |
| WO | 2007085511 A1 | 8/2007 |
| WO | 2009147106 A1 | 12/2009 |
| WO | 2010029730 A1 | 3/2010 |
| WO | 2010043009 A3 | 8/2010 |
| WO | 2010092627 A1 | 8/2010 |
| WO | 2010127947 A2 | 11/2010 |
| WO | 2011058678 A1 | 5/2011 |
| WO | 2011003711 A3 | 6/2011 |
| WO | 2011081498 A3 | 11/2011 |
| WO | 2012023705 A | 2/2012 |
| WO | 2012031885 A1 | 3/2012 |
| WO | 2012043990 A2 | 4/2012 |
| WO | 2012044001 A2 | 4/2012 |
| WO | 2012026715 A3 | 6/2012 |
| WO | 2012085212 A2 | 6/2012 |
| WO | 2012119892 A1 | 9/2012 |
| WO | 2014038150 A1 | 3/2014 |
| WO | 20144095542 A1 | 6/2014 |
| WO | 2014184393 A1 | 11/2014 |

OTHER PUBLICATIONS

European Extended Search Report dated Jun. 22, 2015 regarding European Patent Application No. 14158619.8 filed Mar. 10, 2014.
European Extended Search Report dated Dec. 14, 2015 regarding European Patent Application No. 13775196.2 filed Apr. 11, 2013.
International Patent Application No. PCT/US2013036203, filing date: Apr. 11, 2013, Applicant: Whirlpool Corporation, International Search Report and Opinion mail date: Jul. 26, 2013.
European Search Report, Application No. 4158615.6, Jun. 24, 2015, 5 pages.
European Patent Application No. 15153481.4. filed Feb. 2, 2015, Applicant: Whirlpool Europe S.r.l., Extended European Search Report and Opinion, mail date Jul. 21, 2015 re: same.
BASF, "Balindur™ Solutions for fixing Vaccum Insulated Panels," web page, 4 pages, date unknown, http://performance-materials.basf.us/products/view/family/balindur, at least as early as Dec. 21, 2015.
BASF, "Balindur™, " web page, 2 pages, date unknown, http://product-finderbasf.com/group/corporate/product-finder/en/brand/BALINDUR, at least as early as Dec. 21, 2015.
PU Solutions Elastogram, "Balindur™ masters the challenge," web page, 2 pages, date unknown, http://product-finder.basf.com/group/corporate/product-finder/en/literature-document:/Brand+Balindur-Flyer--Balindur+The+new+VIP+fixation+technology-English.pdf, Dec. 21, 2014.
European Patent Application No. 15154577.9, Search Report, Jul. 20, 2015, 8 pages.
European Patent Application No. 14158619, Search Report, Jun. 22, 2015, 9 pages.
KitchenAid, "Refrigerator user instructions," Sep. 5, 2015, 120 pages.
Supplementary European Search Report, Application No. EP13775196.2, Dec. 7, 2015, 24 pages.
International Search Report, International Application No. PCT/US2016/020896, 3 pages, Aug. 11, 2016, 3 pages.

* cited by examiner

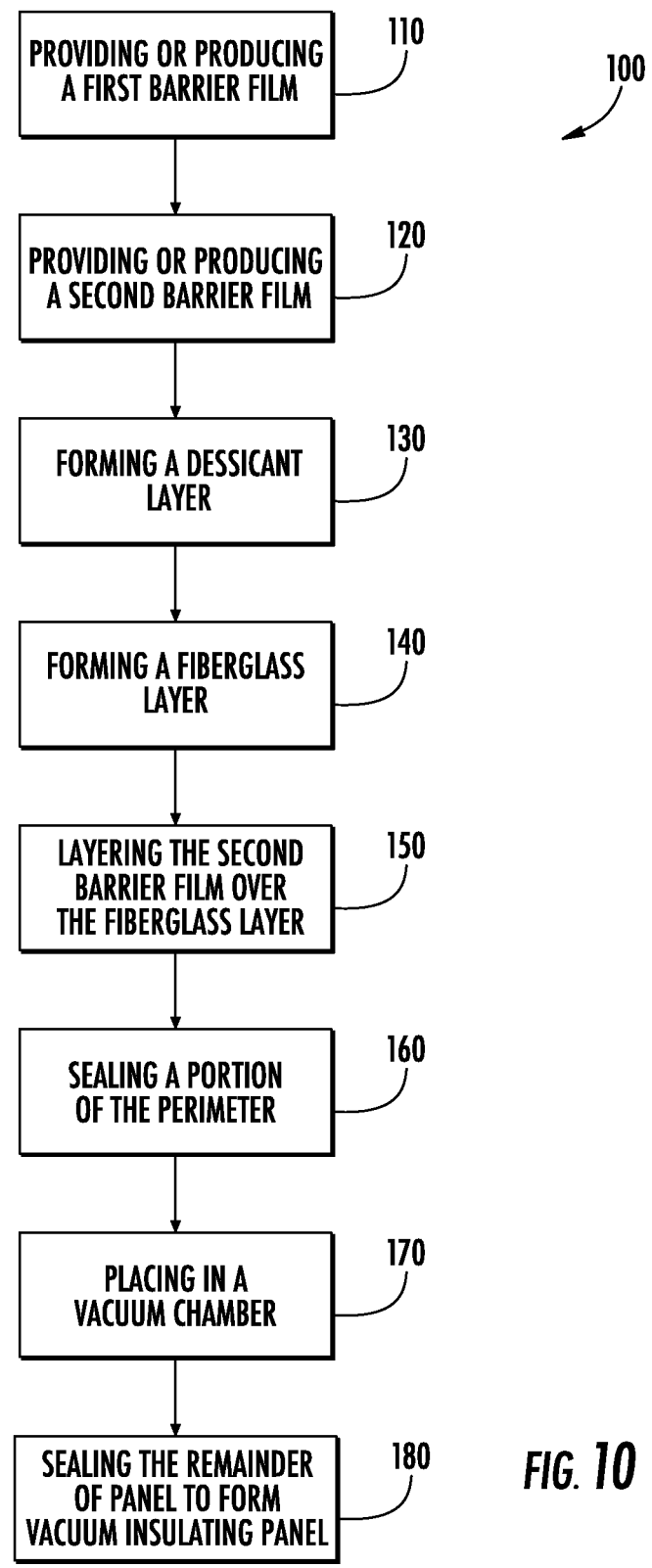

MULTI-SECTION CORE VACUUM INSULATION PANELS WITH HYBRID BARRIER FILM ENVELOPE

BACKGROUND OF THE INVENTION

Vacuum insulation panels are shown in FIG. 1A of the present application, known vacuum insulation panels generally have a first side material 3, a second side material 4 that are typically the same and a single filling material 5. The single filling material may be a fiberglass material 6. As shown in FIG. 1A, both the first side and second side contain a metal foil layer between two thermal plastic layers.

BRIEF SUMMARY OF THE INVENTION

An aspect of the present invention is generally directed toward a multi-layer vacuum insulted panel that includes a first barrier film; a second barrier film; a sealing junction between the first barrier film and the second barrier film; a multi-section central core. The first barrier film includes at least one polymeric material. The first barrier film is free of a metal layer and has an interior facing surface. The second barrier film includes at least one interior polymeric layer, a metal foil layer and at least one exterior polymeric layer positioned on the opposite side of the metal foil layer at the at least one interior polymeric layer. The second barrier layer and first polymeric barrier layer define an interior volume between the first polymeric barrier layer and the second polymeric barrier layer. The interior volume has a width, a length, and a height. The sealing junction between the first barrier film and the second barrier film is located at a sealing section about a perimeter of the first barrier film and the second barrier film where the first barrier film and the second barrier film physically engage one another. The multi-section central core has a first fumed silica region that includes at least one fumed silica compound and at least one fiberglass region that are each discrete regions within the interior volume. The first fumed silica region is positioned within the interior volume and further positioned either (a) along at least a majority of a portion of the interior facing surface of the first barrier film or (b) along and proximate the sealing section and bridging sealing junction where the first barrier film and second barrier film engage one another. The portion of the interior volume free of the first fumed silica region defines a remaining interior volume. Each of the at one least fiberglass region(s) is (are) positioned within the remaining interior volume.

According to another aspect of the present invention, a multi-layer vacuum insulating panel includes a first barrier film, a second barrier film, a connection between the first barrier film and the second barrier film, and a bi-layer central core. The first barrier film typically includes a plurality of polymeric material layers where at least two of the plurality of polymeric layers are formed of different polymers and the first barrier film is free of a metal layer of material, more typically free of any metal material. The first barrier film has an interior facing surface and outwardly extending perimeter rim portion. The second barrier film typically includes at least one interior polymeric layer, a metal foil layer, and at least one exterior polymeric layer positioned on the opposite side of the metal foil layer as the at least one interior polymeric layer. The second barrier layer film and the first barrier film define an interior volume between the first barrier film and the second barrier film. The interior volume has a width, a length, and a height. The second barrier film has an outwardly extending perimeter rim portion. The connection between the first barrier film and the second barrier film is located about the outwardly extending perimeter of the first barrier and the second barrier film where the first barrier film and the second barrier film physically engage one another. The bi-layer central core generally includes a desiccant region and a fibrous region, typically a fiberglass containing region that are typically each discrete regions within the interior volume. Each region makes up from about 30% to about 70% of the interior volume and the desiccant region is positioned adjacent the first barrier film and the fibrous region is positioned adjacent the second barrier film more typically the desiccant region makes up over 50% of the interior volume.

Yet another aspect of the present invention includes a method of producing a multi-layer vacuum insulating panel includes the steps of: providing a first barrier film that includes a plurality of polymeric material layers where at least two of the plurality of polymeric layers are formed of different polymers and the first barrier film is free of a metal layer and the first barrier film has a first surface; providing a second barrier film that includes at least one interior polymeric layer, a metal foil layer, and at least one exterior polymeric layer positioned on the opposite side of the metal foil layer as the at least one interior polymeric layer; forming a desiccant layer that includes fumed silica power adjacent the first surface of the first barrier film; forming a fiberglass layer over at least substantially all of the desiccant layer; layering the second barrier film over the fiberglass layer; and heat sealing a perimeter of the first barrier film with a perimeter of the second barrier film to form the multi-layer vacuum insulating panel.

These and other features, advantages, and objects of the present invention will be further understood and appreciated by those skilled in the art by reference to the following specification, claims, and appended drawings.

BRIEF DESCRIPTION OF THE DRAWINGS

The foregoing summary, as well as the following detailed description of the invention, will be better understood when read in conjunction with the appended drawings. For the purpose of illustrating the invention, there are shown in the drawings, certain embodiment(s) which are presently preferred. It should be understood, however, that the invention is not limited to the precise arrangements and instrumentalities shown. Drawings are not necessary to scale. Certain features of the invention may be exaggerated in scale or shown in schematic form in the interest of clarity and conciseness.

FIG. 10 is a flow chart showing a process of producing a multi-section core vacuum insulation panel according to an aspect of the present invention.

DETAILED DESCRIPTION

Before the subject invention is described further, it is to be understood that the invention is not limited to the particular embodiments of the invention described below, as variations of the particular embodiments may be made and still fall within the scope of the appended claims. It is also to be understood that the terminology employed is for the purpose of describing particular embodiments, and is not intended to be limiting. Instead, the scope of the present invention will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the invention. The upper and lower limits of these smaller ranges may independently be included in the smaller ranges, and are also encompassed within the invention, subject to any specifically excluded limit in the stated range. Where the stated range includes one or both of the limits, ranges excluding either or both of those included limits are also included in the invention.

In this specification and the appended claims, the singular forms "a," "an" and "the" include plural reference unless the context clearly dictates otherwise.

Figure 1:
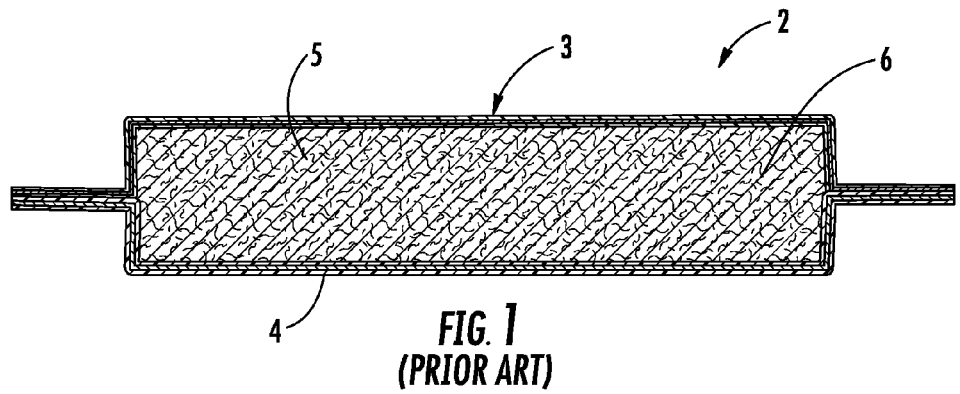
FIG. 1 is a cross-sectional view of a prior art vacuum insulation panel.
Figure 2:
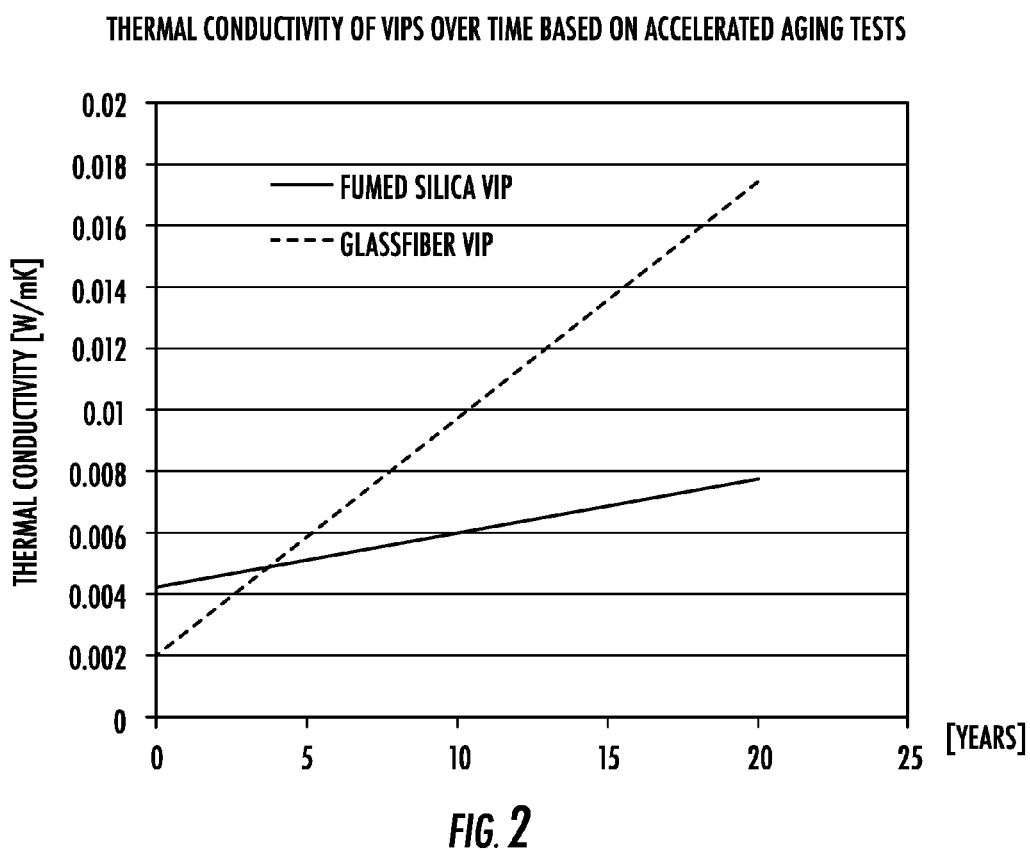
FIG. 2 is a chart showing the thermal conductivity of vacuum insulation panels containing entirely fiberglass and entirely fumed silica with their interior overtime based on accelerated aging tests.
Figure 3:
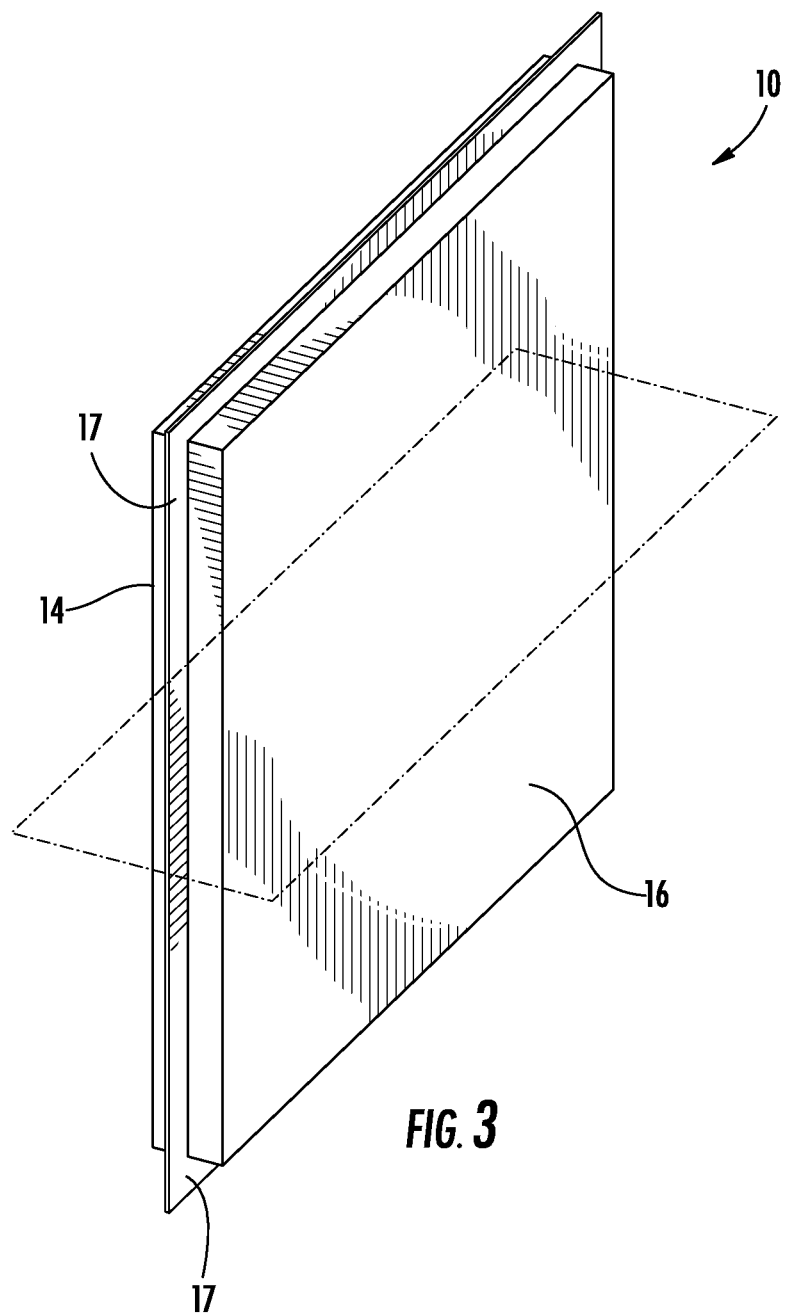
FIG. 3 is a perspective view of a vacuum insulation panel according to an aspect of the present invention.

The present invention is generally directed toward a multi-section core vacuum insulation panel(s) 10 that can be used in connection with insulating an appliance 12. (See FIGS. 3 and 8). As shown in the attached FIG. 2, vacuum insulation panels containing solely fumed silica do not have as high of an initial thermal conductivity compared to vacuum insulation panels containing solely glass fibers, but have less thermal conductivity over a majority of the time period and significantly less as a greater amount of time passes. However, a significant improvement in thermal conductivity is achieved by use of vacuum insulation panels solely containing fiber glass over the first few years.

As shown in FIGS. 3-8A, the multi-section core vacuum insulation panels 10 according to various aspects of the present invention generally include a first barrier film 14; a second barrier film 16; a sealing junction 18; and multi-section core 20 within the interior volume defined by the first barrier film 14 and the second barrier film 16.

Generally speaking, the first barrier film may include one or more layers of the same or various polymeric materials. Such polymeric materials typically include polyethylene terephthalate, polybutylene terephthalate, polypropylene and nylon. One or more combinations of various polymeric materials may be used. Typically the interior facing layer is a heat sealing layer that is often a low density polyethylene layer. The first barrier film is typically free of a metal foil layer and more typically free of metal entirely.

The second barrier film typically includes a metal foil layer 30. Typically, the metal foil layer is the central layer of a three (or more) layer system where an outer layer (or layers) of a polymeric material(s) 32 is (are) on one side of the metal foil and at least one heat seal layer on the interior facing opposite side of the metal foil layer. The interior facing opposite side of the metal foil may have one or more polymeric material layers 34 positioned between the heat seal layer and the metal foil layer. The heat seal layer is a polymeric material typically a low density polyethylene layer, as discussed above.

Most commonly the second barrier film is a three layer film that includes an outer protective layer of polyethylene terephthalate, an aluminum foil middle layer where the aluminum foil has a thickness of at least about 6 µm, and a heat seal layer on the interior facing side of the second barrier film which is typically a low density polyethylene. As discussed above, additional polymer layers on either side of the metal foil layer may be employed. Two or more polymer layers may be employed on the outer facing side of the metal foil and two or more polymeric materials may be placed on the interior facing side of the metal foil. Other possible polymeric materials include those discussed above: polypropylene, nylon, and metalized polyethylene terephthalate. The second barrier film contains an aluminum layer while the first barrier film is typically free of any metal layer more typically free of any metal.

This vacuum insulated panel construction with only one barrier film side containing a metal foil and the other being metal foil layer free helps to facilitate less edge loss, the gas and water penetration through the side of the vacuum insulation panel, thus strikingly increasing the longevity of the vacuum insulation panel.

According to an aspect of the present invention, as shown in FIGS. 4-7, the interior volume of the multi-section core 20, which is defined by the interior facing surfaces 22, 24 of the first barrier film and the second barrier film respectively, contains at least two discrete regions containing a desiccant such as a fumed silica in one region and a inorganic fiber material such as fiberglass in the other discrete region. In addition to fiberglass, other inorganic fibers may be used instead of or in addition to fiberglass. The other fibers include inorganic wool and ceramic fibers.

Figure 4:
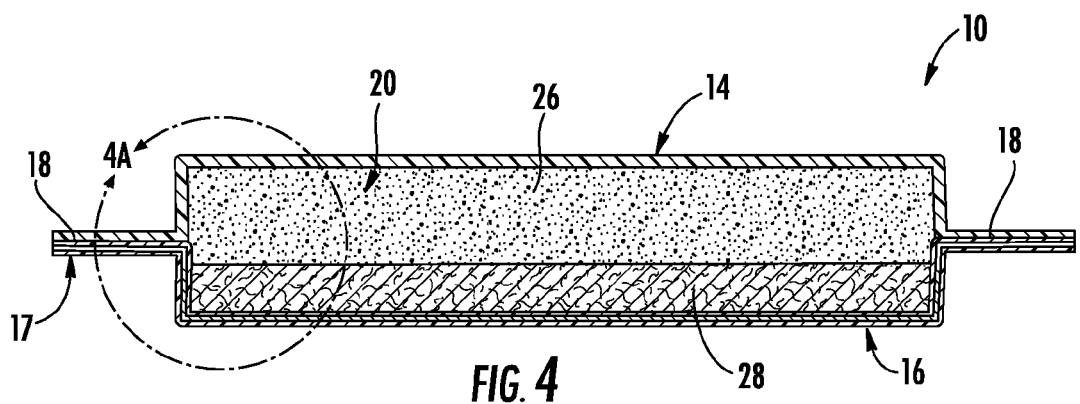
FIG. 4 is a cross-sectional view taken along the plane shown in FIG. 3 according to an embodiment of the present invention.
Figure 4A:
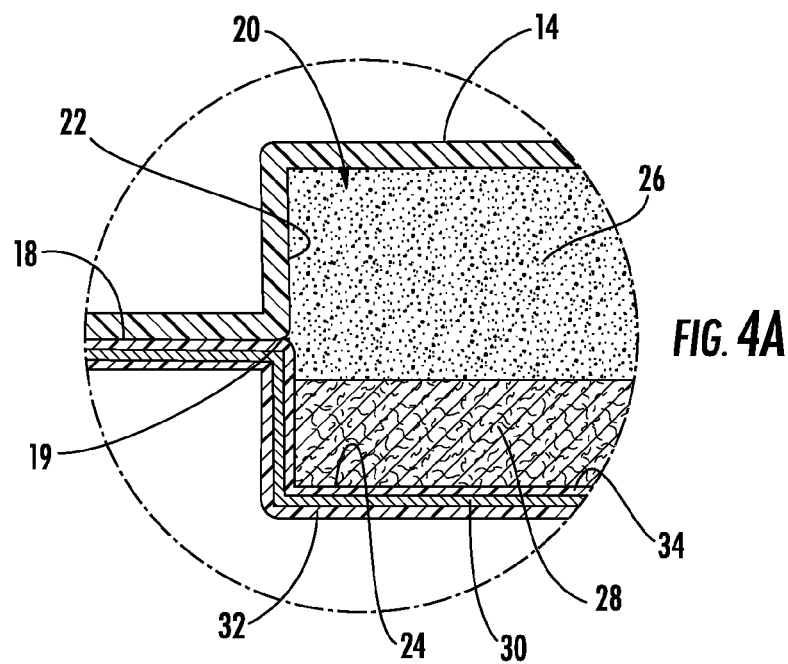
FIG. 4A is an enlarged view of the section designated 4A in FIG. 4 of the present application.
Figure 5:
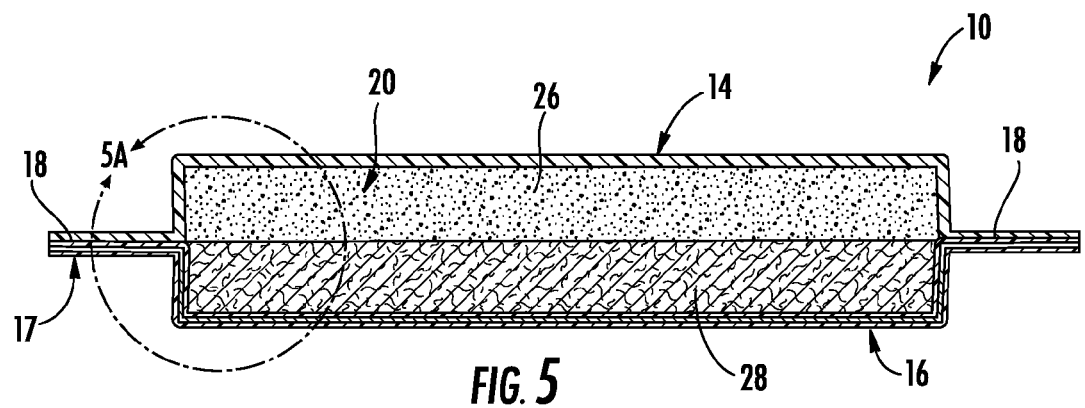
FIG. 5 is a cross-sectional view taken along the plane shown in FIG. 3 according to an embodiment of the present invention.
Figure 5A:
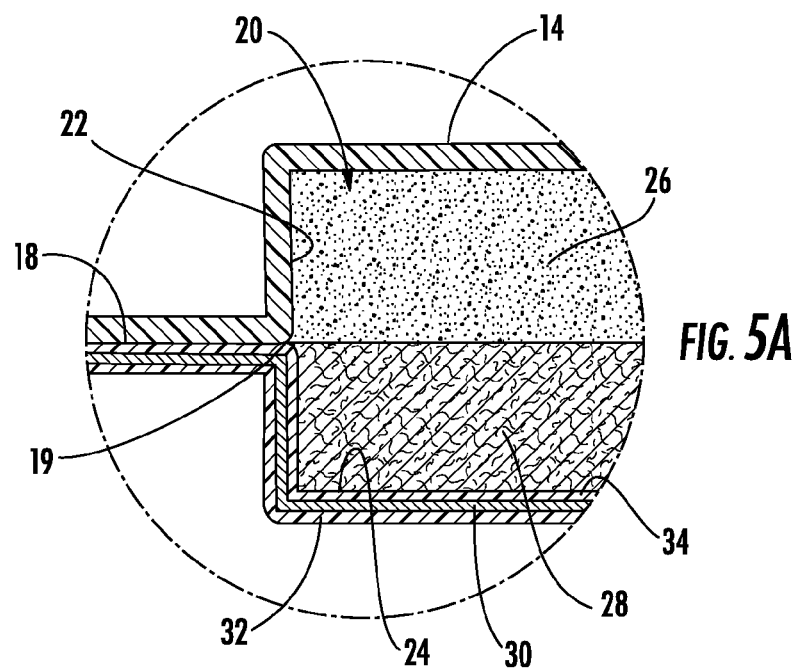
FIG. 5A is an enlarged view of the section designated 5A in FIG. 5 of the present application.

The desiccant region 26 and the fibrous region 28 are shown in FIGS. 4-5A as extending substantially across the width of the vacuum insulation panel 10. As these Figures also show the desiccant region as making up approximately 60% (FIGS. 4 and 4A) or about 50% (FIGS. 5 and 5A) of the interior volume of the vacuum insulation panel and similarly the fibrous region making up about 40% and approximately 50% of the interior volume of the vacuum insulation panel. The desiccant region and the fibrous region in these embodiments are generally rectangular cuboid in shape in the finished vacuum insulation panel. The desiccant region consists essentially of desiccant, i.e. the region is free of any other material that might materially adversely affect the moisture absorbing properties of the region. Minor aspects of impurities may be present, but are not preferred.

Similarly, the fibrous region is typically comprised of one or more fibrous materials, typically fiberglass or one or more inorganic fibrous materials. This region similarly consists of essentially of inorganic material(s), typically one or more inorganic fibrous materials, but may contain minor amounts of other materials that do not materially affect the nature of the fibrous region, in particular that do not materially affect the nature of the vacuum insulating panel's construction and/or the insulation properties of the material(s) within the fibrous region(s).

Importantly, the desiccant region(s) typically encompasses at least about 30%, 50%, over 50%, about 55%, about 60% or more, about 70% or more, or about 75% or more of the total interior volume of the vacuum insulation panel. Additionally, while it is possible to locate the desiccant region elsewhere in the vacuum insulation panel, the most significant improvements are achieved by having the desiccant region cover all of the volume defined by the first barrier film and extending over the sealing junction 18 into at least a portion of the interior volume defined by the second barrier film 16 as shown in FIGS. 4-5A. The desiccant increases the longevity of the vacuum insulation panel due to its moisture absorbing properties. As moisture is transmitted through the first barrier film, moisture vapor is absorbed and typically captured and retained by the large amount of desiccant material thereby preventing loss of vacuum pressure in the vacuum insulation panel and increasing the longevity of the vacuum insulation panel.

The desiccant region may include a plurality of the different desiccants. A preferred desiccant is a fumed silica powder. The fumed silica may be a pyrogenic silica having microscopic droplets of amorphous silica fused together. The fumed silica may have a (Brunauer Emmett and Teller BET) specific surface area of at least 380 $m^2/g$. A higher surface area and moisture absorption rate material is most preferred. The desiccant region will either be positioned within the interior volume of the vacuum insulation panel along at least a majority (typically all) of the interior facing surface of the first barrier film and/or along and approximate the sealing junction 18 of the sealing section 17 between the first barrier film 14 and the second barrier film 16, specifically along and proximate the sealing junction 18 and bridging the junction point where the first barrier film and the second barrier film engage one another (in the cross section). The desiccant region is typically contains one or more fumed silica and is free of fibrous material. More typically, the desiccant region is a single fumed silica powder only and free of any other materials. The desiccant material, as shown in FIGS. 4-5A, typically extends across the width and length of the interior volume.

Similarly, the fibrous region may contain a plurality of the different (inorganic) fiber materials, but typically contains one or more fiberglass materials. As shown in FIGS. 4-5A, the fibrous region is typically a rectangular cuboid shaped material in the completed vacuum insulation panels and extends such that it covers the interior surface of the second barrier film. The fibrous region also typically extends across the width and length of the interior volume.

Figure 6:
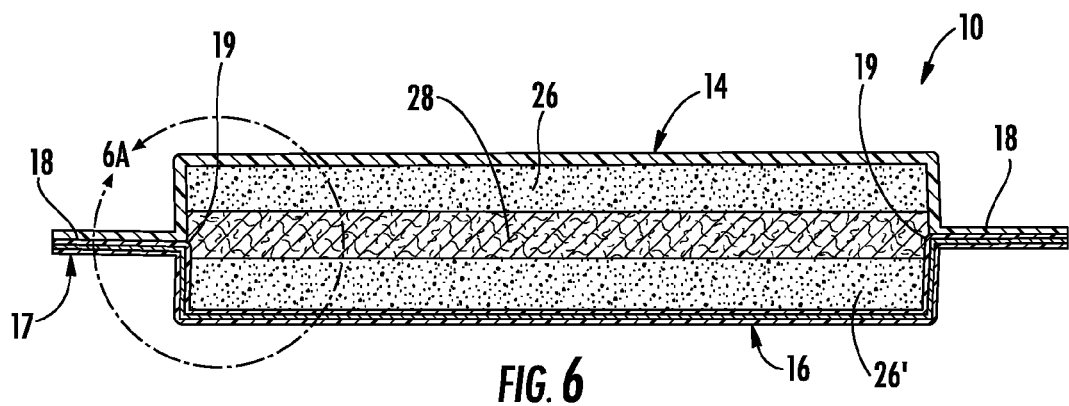
FIG. 6 is a cross-sectional view taken along the plane shown in FIG. 3 according to an embodiment of the present invention.
Figure 6A:
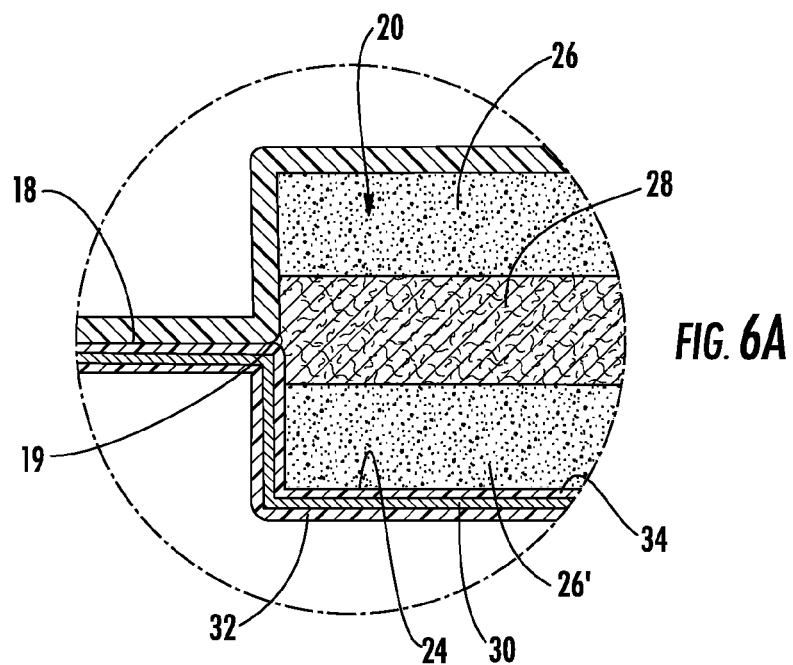
FIG. 6A is an enlarged view of the section designated 6A in FIG. 6 of the present application.

An alternative embodiment is shown in FIGS. 6 and 6A. In this embodiment, the fibrous material bridges the junction point 19 between the first barrier film 14 and the second barrier film 16 forming a rectangular cuboid central layer. The desiccant regions 26, 26' are on opposing sides of the fibrous region. Both desiccant regions are similarly rectangular cuboid in shape.

Figure 7:
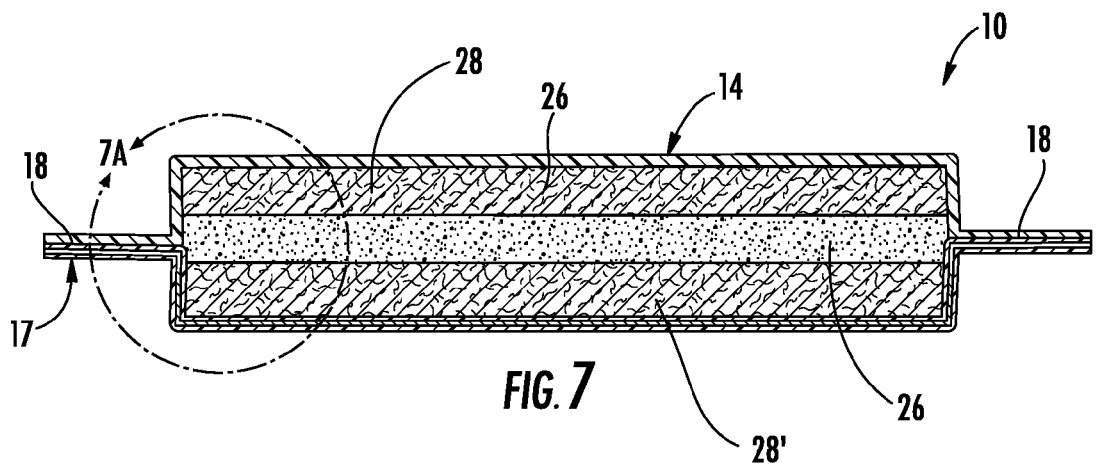
FIG. 7 is a cross-sectional view taken along the plane shown in FIG. 3 according to an embodiment of the present invention.
Figure 7A:
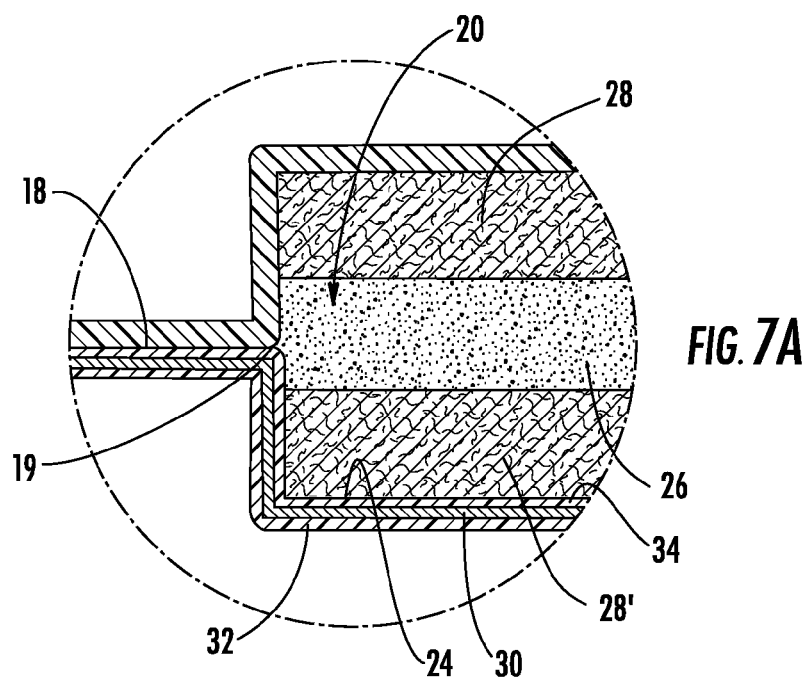
FIG. 7A is an enlarged view of the section designated 7A in FIG. 7 of the present application.

Another aspect of the present invention is shown in FIGS. 7 and 7A. In this aspect, the desiccant region is a rectangular cuboid bridging the sealing junction 18 and the junction point 19 between the first barrier film 14 and the second barrier film 16. The fibrous regions 28, 28' are similarly rectangular cuboid in shape and on opposing sides of the central desiccant region.

Figure 8:
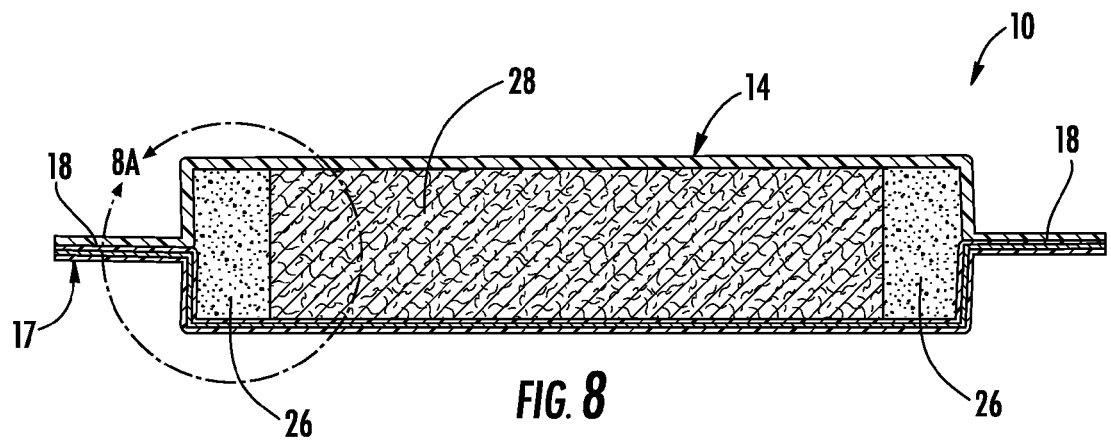
FIG. 8 is a cross-sectional view taken along the plane shown in FIG. 3 according to an embodiment of the present invention.
Figure 8A:
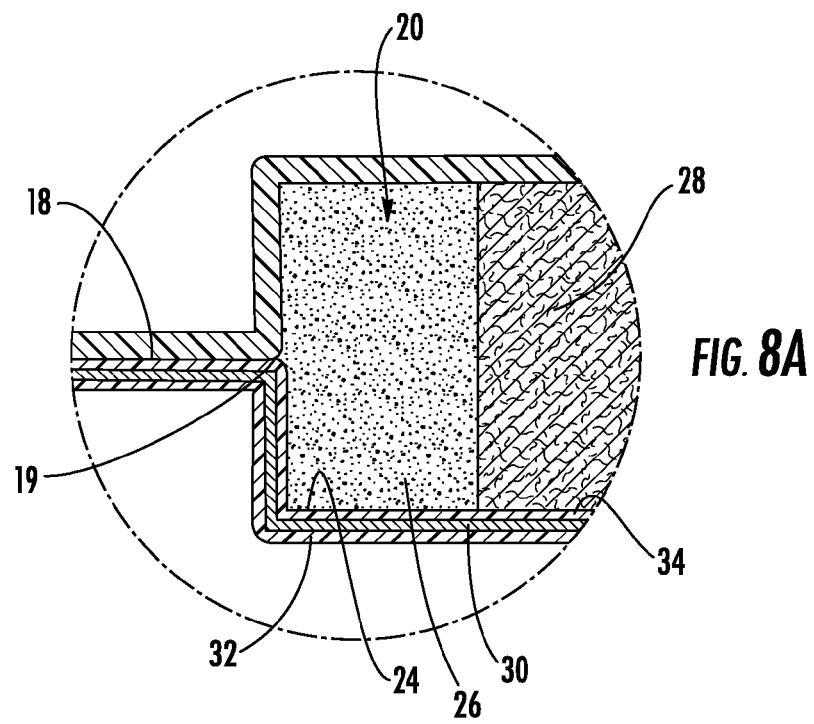
FIG. 8A is an enlarged view of the section designated 7A in FIG. 7 of the present application.

Another aspect of present invention is shown in FIGS. 8 and 8A. In this aspect, the desiccant region occupies the volume about the perimeter of the vacuum insulation panel on all four sides of the vacuum insulation panel interior and bridges the sealing junction 18 between the first barrier film 14 and the second barrier film 16 and extends from the first barrier film to the second barrier film. The fibrous region 28 occupies the center portion of the interior volume of the vacuum insulation panel.

The multi-section core vacuum insulation panels of the present invention typically have an initial thermal conductivity of about 3 mW/m·K and after 10 years has a thermal conductivity of at least about 8 mW/m·K or less (based upon a 180 day accelerated aging test at 82° C. to simulate wear after 10 years in real application).

The method of producing the multi-layer insulating panel(s) 100 described herein typically includes the step of producing or providing a first barrier film 110 comprising a plurality of polymeric material layers where at least two of the plurality of polymeric layers are formed of different polymers and the first barrier film is free of a metal layer and has a first surface. The process further typically includes producing or providing a second barrier film 120 that includes at least one interior polymeric layer, a metal foil layer (typically an aluminum foil layer) and more typically an aluminum foil layer having at least 6 microns thickness, at least one exterior polymeric layer positioned on the opposite side of the metal foil layer as the at least one interior polymeric layer.

The process further typically includes the step of forming at least one desiccant layer or region 130 that comprises, consists essentially of, or consists of a fumed silica powder. The desiccant layer is typically positioned adjacent the first surface of the first barrier film, but could alternatively be positioned such that it bridges the junction between the first barrier film and the second barrier film. The process further typically includes forming a fiberglass layer 140 over at least substantially all of the desiccant layer when the desiccant layer is a planar layer. This step may alternatively involve forming a fiberglass region or layer in such a manner as to fill the remaining interior volume of the multi-layer vacuum insulation panel being formed that is not occupied by the desiccant layer. The process typically next include layering the second barrier film over the fiberglass layer 150 when both the desiccant layer and fiberglass (fibrous) layer are planar or over the central core section of the vacuum insulated panel. Next a portion of the sealing section is sealed 160 around the perimeter of the vacuum panel. The partially sealed vacuum insulated panel is then placed in a vacuum chamber 170 where a vacuum is applied and the remaining, unsealed portion of the sealing section sealed 180, typically also by heat sealing.

Figure 9:
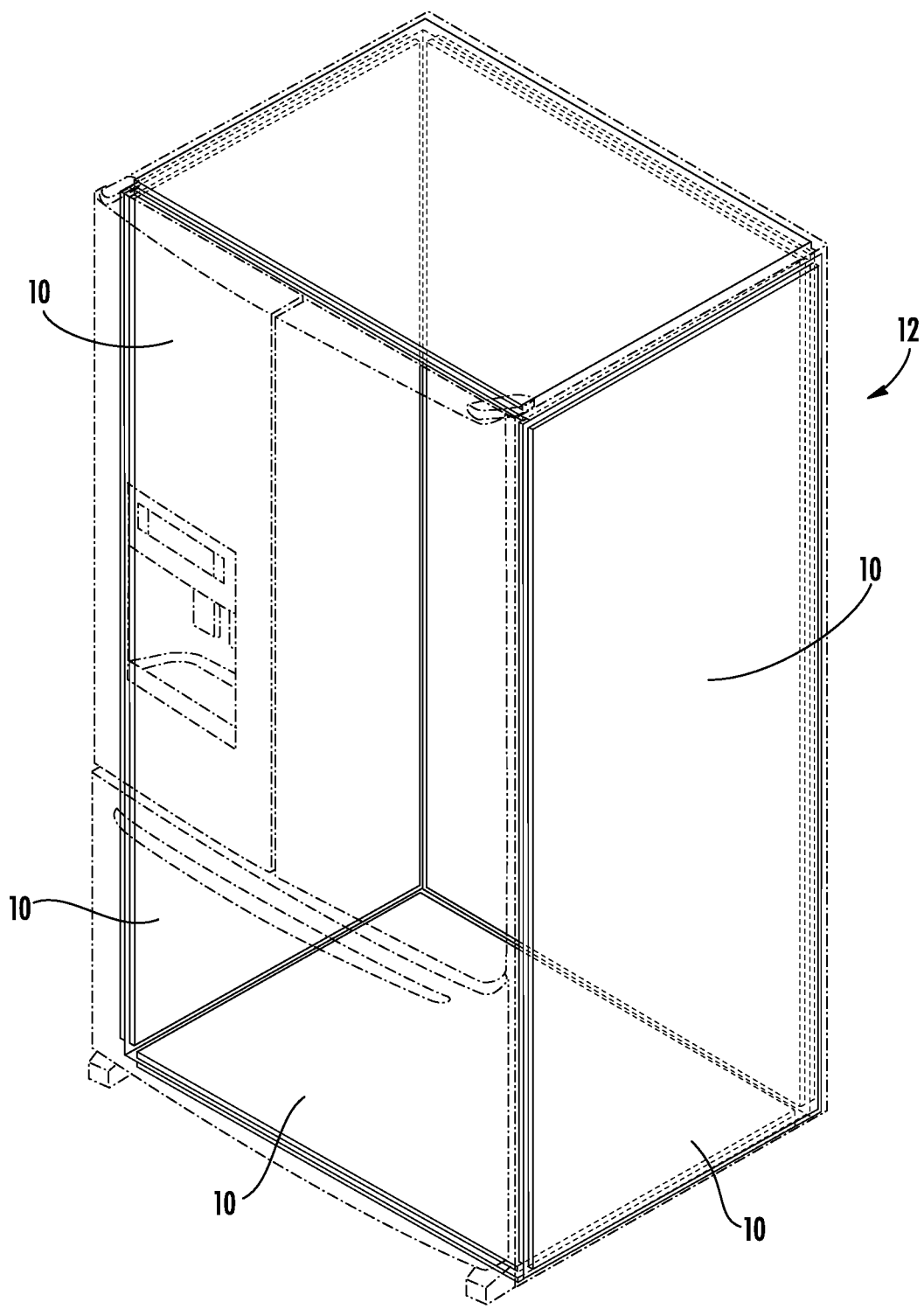
FIG. 9 is a perspective view of an appliance showing incorporation the multi-sectional core vacuum insulation panels within the appliance walls.

Thereafter, the completed multi-section core vacuum insulated panel may be installed between any two walls of an appliance, typically a refrigerator. (See FIG. 9). The panels may be placed between the exterior and interior walls or between two interior walls in a mullion. The thickness of a wall using the multi-section core vacuum insulated panels may maintain the same thickness as a wall without, but would conserve more energy or alternatively wall thickness may be lessened to increase interior volume of the appliance to allow for greater food storage while maintaining the same energy efficiency as an appliance with thicker walls employ more traditional urethane foam insulation only.

The invention claimed is:

1. A multi-layer vacuum insulating panel comprising:
a first barrier film comprising at least one polymeric material layer wherein the first barrier film is free of a metal layer whereby moisture is transmitted through the first barrier film, and wherein the first barrier film has an interior facing surface;
a second barrier film comprising at least one interior polymeric layer, a metal foil layer, and at least one exterior polymeric layer positioned on the opposite side of the metal foil layer as the at least one interior polymeric layer;
wherein the second and the first barrier film define an interior volume between the first barrier film and the second barrier film and wherein the interior volume has a width, a length and a height;
a sealing junction between the first barrier film and the second barrier film at a sealing section about a perimeter of the first barrier film and the second barrier film where the first barrier film and the second barrier film physically and sealingly engage one another; and
a multi-section central core having at least one desiccant region containing fumed silica that comprises at least one fumed silica compound and at least one fiberglass region that are each discrete regions within the interior volume; and
wherein the at least one desiccant region is positioned within the interior volume and further positioned along and proximate the sealing section and bridging the sealing junction where the first barrier film and the second barrier film engage one another;
and wherein the portion of the interior volume free of the at least one desiccant region defines a remaining interior volume; and wherein the at least one fiberglass region is positioned within the remaining interior volume, and wherein the desiccant region is disposed between the fiberglass region and the first barrier film such that moisture transmitted through the first barrier film cannot reach the fiberglass region without passing through the desiccant region.

2. The multi-layer vacuum insulating panel of claim 1, wherein the fiberglass region is positioned within the interior and extends across the width and length of the interior volume and is adjacent the second barrier film.

3. The multi-layer vacuum insulating panel of claim 2, wherein the at least one desiccant region is positioned within the interior and extends across the width and length of the interior volume and is adjacent the first barrier film.

4. The multi-layer vacuum insulating panel of claim 3, wherein the multi-layer vacuum insulating panel has an initial thermal conductivity of about 3 mW/m·K and after 10 years has a thermal conductivity of at least about 8 mW/m·K or less based upon a 180 day accelerated aging test at 82° C. to simulate wear after 10 years.

5. The multi-layer vacuum insulating panel of claim 4, wherein the at least one desiccant region consists essentially of the first fumed silica compound and is free of fibrous material.

6. The multi-layer vacuum insulating panel of claim 1, wherein the at least one desiccant region consists essentially of at least one fumed silica and extends across the width and length of the interior volume.

7. The multi-layer vacuum insulating panel of claim 1, wherein the at least one desiccant region is positioned about a perimeter volume of the interior volume wherein the perimeter volume is proximate the sealing junction and the at least one desiccant region extends between the first barrier film and the second barrier film and wherein the at least one fiberglass region is positioned within a center volume of the interior volume and extends between the first barrier film and the second barrier film.

8. The multi-layer vacuum insulating panel of claim 7, wherein the at least one desiccant region consists of fumed silica and the at least one fiberglass region consists of fiberglass.

9. The multi-layer vacuum insulating panel of claim 1, wherein the at least one fiberglass region further extends across the width of the interior volume and the fiberglass region is a continuous section.

10. The multi-layer vacuum insulating panel of claim 9, wherein the at least one desiccant region is a continuous section of the multi-layer vacuum insulating panel.

11. The multi-layer vacuum insulating panel of claim 10, wherein the at least one fiberglass region is positioned between the at least one desiccant region and a second desiccant region wherein the at least one desiccant region is positioned adjacent the first barrier film and the second desiccant region is positioned adjacent the second barrier film.

12. The multi-layer vacuum insulating panel of claim 1, wherein the interior polymeric layer of the second barrier film is a polymer adapted to heat sealingly engage the first barrier film and the exterior polymeric layer is a polymeric protective layer comprised of a polyester thermoplastic polymer resin.

13. The multi-layer vacuum insulating panel of claim 12, wherein the polyester thermoplastic polymer resin is chosen from the group consisting of polyethylene terephthalate and polybutylene terephthalate and wherein the metal foil layer of the second barrier film is an aluminum foil layer.

14. The multi-layer vacuum insulating panel of claim 1, wherein the first barrier film has at least one side wall about a perimeter of the first barrier film that extends away from the sealing junction and further comprises a substantially planar center section interconnected with the at least one side wall such that the first barrier film is tray-shaped; and wherein the second barrier film has at least one side wall about a perimeter of the second barrier film that extends away from the sealing junction and further comprises a substantially planar center section interconnected with the at least one side wall such that the second barrier film is tray-shaped.

15. A multi-layer vacuum insulating panel comprising:
a first barrier film comprising at least one polymeric material layer wherein the first barrier film is free of a metal layer whereby moisture is transmitted through the first barrier film, and wherein the first barrier film has an interior facing surface;
a second barrier film comprising at least one interior polymeric layer, a metal foil layer, and at least one exterior polymeric layer positioned on the opposite side of the metal foil layer as the at least one interior polymeric layer; wherein the second and the first polymeric barrier film define an interior volume between the first barrier film and the second barrier film and wherein the interior volume has a width, a length and a height;
a sealing junction between the first barrier film and the second barrier film at a sealing section about a perimeter of the first barrier film and the second barrier film where the first barrier film is heat sealed to the second barrier film; and a multi-section central core having at least one desiccant region that comprises at least one fumed silica compound and at least one fiberglass region that are each discrete regions within the interior volume; and wherein the at least one desiccant region is positioned within the interior volume and further positioned along at least a majority of a portion of the interior facing surface of the first barrier film; and wherein the portion of the interior volume free of the at least one desiccant region defines a remaining interior volume; and wherein the at least one fiberglass region is positioned within the remaining interior volume, and wherein the desiccant region is disposed between the fiberglass region and the first barrier film such that moisture transmitted through the first barrier film cannot reach the fiberglass region without passing through the desiccant region.

16. The multi-layer vacuum insulating panel of claim 15, wherein the at least one desiccant region bridges the sealing junction where the first barrier film and the second barrier film engage one another.

17. The multi-layer vacuum insulating panel of claim 15, wherein the fiberglass region is positioned within the interior and extends across the width and length of the interior volume and is adjacent the second barrier film.

18. The multi-layer vacuum insulating panel of claim 17, wherein the at least one desiccant region is positioned within the interior and extends across the width and length of the interior volume and is adjacent the first barrier film.

19. The multi-layer vacuum insulating panel of claim 18, wherein the at least one desiccant region consists essentially of the first fumed silica compound and is free of fibrous material.

20. The multi-layer vacuum insulating panel of claim 15, wherein the at least one desiccant region consists essentially of at least one fumed silica and extends across the width and length of the interior volume.

\* \* \* \* \*